US008775569B2

(12) United States Patent
Baumann

(10) Patent No.: US 8,775,569 B2
(45) Date of Patent: Jul. 8, 2014

(54) METHOD FOR UPDATING THE DATA OF A NAVIGATION SYSTEM

(75) Inventor: Reiner Baumann, Moerfelden-Walldorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 318 days.

(21) Appl. No.: 13/131,715

(22) PCT Filed: Nov. 17, 2009

(86) PCT No.: PCT/EP2009/008172
§ 371 (c)(1),
(2), (4) Date: Aug. 18, 2011

(87) PCT Pub. No.: WO2010/060554
PCT Pub. Date: Jun. 3, 2010

(65) Prior Publication Data

US 2011/0295976 A1 Dec. 1, 2011

(30) Foreign Application Priority Data

Nov. 27, 2008 (DE) ........................ 10 2008 059 278

(51) Int. Cl.
*G06F 15/16* (2006.01)
*G06F 12/00* (2006.01)

(52) U.S. Cl.
USPC .......................................... 709/219; 709/250

(58) Field of Classification Search
CPC ................ B60W 2510/244; B60W 2550/143; B60W 2550/402; B60W 10/06; B60W 10/08; B60W 20/102; B60W 20/104; B60W 20/00; B60W 50/0097; G01C 21/3469; G01C 21/32; B60K 2015/03217; Y10S 903/93; G08G 1/096
USPC .......................... 709/217–219, 225–229, 250
See application file for complete search history.

(56) References Cited

U.S. PATENT DOCUMENTS 5,806,018 A 9/1998 Smith et al.
5,951,620 A 9/1999 Ahrens et al.
6,169,955 B1 * 1/2001 Fultz ............................ 701/427
6,421,602 B1 7/2002 Bullock et al.
6,560,529 B1 5/2003 Janssen
6,577,943 B2 6/2003 Nakao et al.
7,079,946 B2 7/2006 Hunzinger
7,089,546 B2 8/2006 Watanabe et al.

(Continued)

FOREIGN PATENT DOCUMENTS

DE 19842176 A1 3/2000
DE 19847953 B4 2/2005

(Continued)

OTHER PUBLICATIONS

International Searching Authority, International Search Report for European Application No. PCT/EP2009/008172, dated Mar. 18, 2010.

*Primary Examiner* — Zarni Maung
(74) *Attorney, Agent, or Firm* — Ingrassia Fisher & Lorenz, P.C.

(57) ABSTRACT

In a method for updating the data of a data storage device of a navigation system, updated data are transmitted by local data transmission stations and stored in the data storage device. To improve the usage opportunities of the navigation system, the updated data are transferred to a service provider.

15 Claims, 1 Drawing Sheet

(56) References Cited

U.S. PATENT DOCUMENTS

| | | | | |
|---|---|---|---|---|
| 7,430,218 | B2 | 9/2008 | Lee et al. | |
| 7,617,041 | B2 | 11/2009 | Sera | |
| 2002/0046285 | A1* | 4/2002 | Yasushi et al. | 709/228 |
| 2002/0087262 | A1 | 7/2002 | Bullock et al. | |
| 2002/0138545 | A1* | 9/2002 | Andreakis et al. | 709/200 |
| 2003/0134637 | A1* | 7/2003 | Cooper | 455/432 |
| 2004/0056766 | A1* | 3/2004 | Butz et al. | 340/539.1 |
| 2004/0133344 | A1 | 7/2004 | Hashida et al. | |
| 2005/0262035 | A1* | 11/2005 | Itabashi et al. | 707/1 |
| 2006/0047420 | A1 | 3/2006 | Tanaka | |
| 2008/0082255 | A1* | 4/2008 | Takahata et al. | 701/201 |
| 2008/0261513 | A1* | 10/2008 | Shin et al. | 455/3.06 |

FOREIGN PATENT DOCUMENTS

| | | | |
|---|---|---|---|
| DE | 102004041934 | A1 | 3/2005 |
| EP | 0317181 | A2 | 5/1989 |
| EP | 0786646 | A2 | 1/1997 |
| EP | 0786646 | A2 | 7/1997 |
| EP | 1150266 | A2 | 10/2001 |
| EP | 1267261 | A2 | 5/2002 |
| EP | 1431711 | A2 | 6/2004 |
| EP | 1489578 | A2 | 12/2004 |
| EP | 1742189 | A2 | 1/2007 |
| JP | 2002277275 | A | 9/2002 |

* cited by examiner

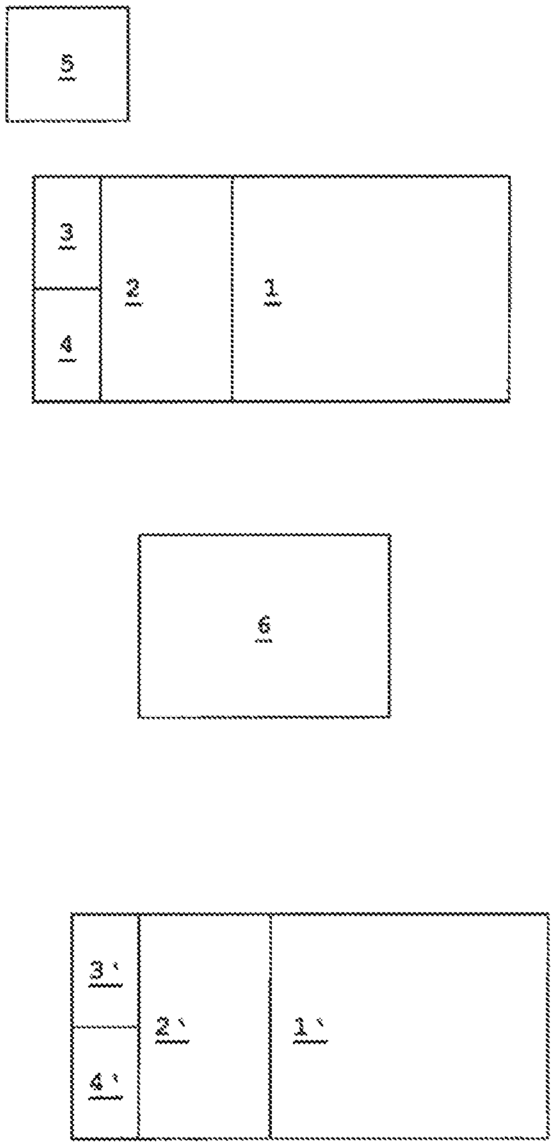
5
3
2
1
4
6
3`
2`
1`
4`

METHOD FOR UPDATING THE DATA OF A NAVIGATION SYSTEM

CROSS-REFERENCE TO RELATED APPLICATIONS

This application is a U.S. National-Stage entry under 35 U.S.C. §371 based on International Application No. PCT/EP2009/008172, filed Nov. 17, 2009, which was published under PCT Article 21(2) and which claims priority to German Application No. 102008059278.1, filed Nov. 27, 2008, which are all hereby incorporated in their entirety by reference.

TECHNICAL FIELD

The invention relates to a method for updating the data of a data storage device of a navigation system, wherein data are transmitted from local data transmission stations and stored in the data storage device.

BACKGROUND

Navigation systems have access to a position determination device with which their position in space can be determined, for example by means of GPS signals or in future, Galileo signals. By means of a route calculation unit, a travel route to a destination specified by the user of the navigation system can be determined from the instantaneous position, and corresponding instructions as to the direction of travel can be output visually and/or acoustically. To do so, the route calculation unit accesses data relating to the navigable road network that can be travelled stored on a data storage device.

To obtain optimal route determination and to avoid traffic congestion it is known to receive additional information, e.g. according to the TMC standard (TMC=Traffic Message Channel), and to take this into account in calculating the route. It is also known to update the data, in order to be able to respond to, for example, road closures, road works sites or the like, by outputting alternative routes.

To this end, EP 0 786 646 A2 discloses spatially distributed data transmission stations, in each of which the most up-to-date data on the road conditions or road closures relevant to a local area are held, ready for access. When an appropriately equipped motor vehicle approaches a corresponding data transmission station, these data can then be transmitted wirelessly to a navigation system of the motor vehicle, so that the navigation system can calculate an alternative route where appropriate.

Furthermore, U.S. Pat. No. 5,806,018 A describes a method for providing navigation data for a navigation system of a motor vehicle. In this case, additional data, including those relevant to local road information, are transmitted to the motor vehicle whenever this is connected to a local station, for example while it is filling up with fuel.

It can be regarded as a disadvantage of this system, however, that the updating of data is only possible for a navigation system in a motor vehicle which is already located within reception range of a data transmission station, or which is connected to a local station. Updating a data storage device of a navigation system in a remote region is not possible.

At least one problem addressed by the invention is to specify a method of the kind stated above for updating data, with which the updated data can be made available to other users. In addition, other problems, desirable features and characteristics will become apparent from the subsequent summary and detailed description, and the appended claims, taken in conjunction with the accompanying drawings and this background.

SUMMARY

The at least one problem is solved by the fact that the updated data are transferred to a service provider. In addition, an appropriately constructed navigation system and a motor vehicle equipped with such navigation system are specified.

In a method according to an embodiment of the invention, data about the road network, for example, that have been updated by a navigation system with suitable transmission and receiving devices are received and these data are stored in a data storage device of the navigation system, in order to be able to be taken into account in the planning of future routes. These data can include newly built roads, modified traffic routings, free parking spaces, and road closures due to temporary road works, large-scale events or the like, among others. The data are received in a manner known per se by local data transmission stations, wherein these are preferably operated by local authorities or administrations authorized for the purpose. In principle a service provider can also provide such local data transmission stations, in order to be able to continuously provide the users of its traffic data with updated data.

If a navigation system or a data storage device has received the updated data, it is possible then to transfer or to relay the updated data to a central service provider, so that this can forward the data, for example regarding a current road closure, to all its users. The reception and forwarding of the data preferably takes place as described in the following.

At least one advantage is in the fact that by forwarding and making the updated data available, all users of the updated data can take advantage of it. By forwarding the data to the central service provider, which makes the updated data available to all its users, it is also possible to inform a user who is not yet in the vicinity of, for example, a temporary road closure to circumvent this area.

Preferably, the updated data are transmitted and received by wireless means. This can take place for example with a mobile radio link, according to the so-called Bluetooth standard, over the internet, by TMC messages on the radio or with RFID technology ("radio frequency identification device"). Therefore, in particular an automatic updating of data can be carried out without the active involvement of the user.

For example, the navigation system can continuously emit request signals using the Bluetooth standard, to find out whether updated data are available. As soon as the motor vehicle equipped with an appropriately constructed navigation system is located in a reception range of a local data transmission station, this receives the request and where appropriate, can transmit the updated data to the navigation system. It is also possible that the updated data are continuously broadcast by the data transmission station and are passively received by the navigation system, as soon as it is located within reception range.

As soon as updated data have been received by the navigation system, a corresponding message is output visually and/or acoustically, for example a text-based message: "Updated data received" on a display, in order to inform the user appropriately.

In an advantageous embodiment the navigation system is equipped with a portable and rewritable data storage device, for example in the form of a rewritable compact disc or of a so-called USB stick, in order to be able to store the updated data and to edit them, for example, on a domestic computer.

Naturally, the computer is equipped with suitable software for this purpose.

In the same way the navigation system can also be designed in such a manner that the updated data are relayed wirelessly with a transmission and receiving device, also over a mobile radio link or according to the Bluetooth standard, among other means.

Likewise, via an input/output device of the navigation system a user can input manually updated data, such as an additional house number that is assigned to a building.

According to an extension, updated data can be forwarded either by the navigation system itself, for example via a WLAN connection, or via the domestic PC over the internet, e.g. by email. Therefore, a central service provider can be directly informed about updated data, so that it can in turn make the data available to its users, for example by wireless means and/or over the internet.

For this purpose the navigation system, which is designed either as a mobile device or is installed permanently in a motor vehicle, is designed with appropriate hardware and/or software technology, in order to receive updated data and to forward the updated data wirelessly, for example.

It is understood that the previously cited features and those yet to be explained below are applicable not only in the respective combination indicated, but also in other combinations. The scope of the invention is defined only by the claims.

BRIEF DESCRIPTION OF THE DRAWINGS

The present invention will hereinafter be described in conjunction with the following drawing FIGURE that shows a schematic illustration of a motor vehicle with a data transmission station for carrying out the method according to an embodiment of the invention.

DETAILED DESCRIPTION

The following detailed description is merely exemplary in nature and is not intended to limit application and uses. Furthermore, there is no intention to be bound by any theory presented in the preceding background or summary the following detailed description.

The motor vehicle 1 is equipped with a navigation system 2, which is provided with a data storage device 3 and transmission and receiving devices 4 for wireless communication with a local data transmission station 5, which is operated for example by a community, local authority or a service provider.

Updated data, for example relating to a current road closure, are broadcast by the local data transmission station 5 via a mobile radio link, according to the TMC standard or via a Bluetooth connection, and received by the transmission and receiving device 4. The updated data are stored in the data storage device 3, so that they can be taken into account in future route calculations for the motor vehicle 1.

The navigation system 2 is furthermore designed in such a manner that the updated data can also be transferred to a central service provider 6 by wireless means and/or over the internet. Naturally the service provider 6 is not located in the area of the local data transmission station 5, but is a large distance away from it.

The service provider 6 can make the received and updated data available in turn to other motor vehicles 1' or their navigation systems 2', which are not located in the region of the local data transmission station 5. Therefore, the users of the other motor vehicles 1' can also take advantage of the updated data, to circumvent a traffic jam, for example, in the region of the local data transmission station 5.

While at least one exemplary embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

LIST OF REFERENCE NUMBERS

1. Motor vehicle
2. Navigation system
3. Storage device
4. Transmission and receiving device
5. Data transmission station
6. Service provider

The invention claimed is:

1. A method for updating data of a data storage device of a navigation system, comprising:

receiving data from, and updated by, local data transmission stations, wherein the data comprises navigation system data detailing conditions of a road network;

storing the data, updated by the local data transmission stations, in the data storage device, wherein the data storage device is located in the navigation system, and wherein the navigation system is located onboard a vehicle;

transferring the data stored in the data storage device to a service provider; and transmitting the data received by the service provider to a second navigation system.

2. The method according to claim 1, wherein the transferring the data comprises wirelessly transmitting the data to the service provider.

3. The method according to claim 1, wherein the receiving the data takes place actively or passively.

4. The method according to claim 1, further comprising generating a message upon receipt of the data by the navigation system.

5. The method according to claim 1, wherein the data storage device is portable and rewritable.

6. The method according to claim 1, wherein the transmitting of the data comprises transmitting the data to the service provider over the internet.

7. A navigation system, comprising:

a receiving device configured to receive data from, and updated by a local data transmission station, wherein the data comprises navigation system data detailing conditions of a road network;

a data storage device configured to store the data received by the receiving device, wherein the data storage device is located in the navigation system, and wherein the navigation system is located onboard a vehicle; and a transmitting device configured to:

transmit a request to receive the data updated by the local data transmission station; and transmit the data stored by the data storage device a service provider.

8. The navigation system according to claim 7, wherein the receiving the data takes place passively.

9. The navigation system according to claim 7, further comprising a message generator configured to generate a message upon receipt of the data by the navigation system.

10. The navigation system according to claim 9, wherein the message is a visual message.

11. The navigation system according to claim 7, wherein the transmitting device is a wireless transmitting device.

12. The navigation system according to claim 7, wherein the data storage device is portable.

13. The navigation system according to claim 7, wherein the data storage device is rewritable.

14. The navigation system according to claim 7, wherein the data storage device is portable.

15. The navigation system according to claim 7, wherein the transmitting device is configured to transmit the data to the service provider over the internet.

* * * * *